UNITED STATES PATENT OFFICE.

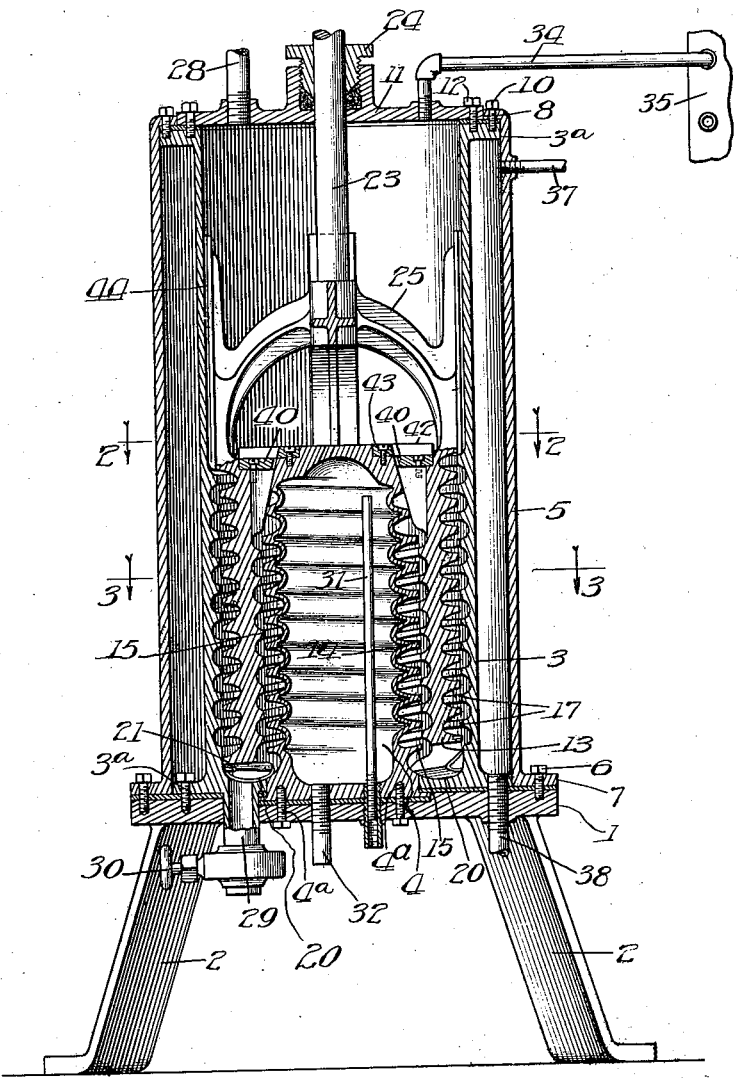

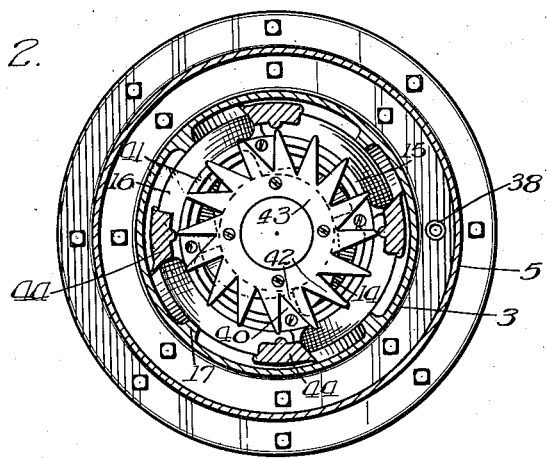

JULIAN G. GOODHUE, OF CHICAGO, ILLINOIS.

APPARATUS FOR TREATING FOOD OR OTHER MATERIALS.

1,290,734. Specification of Letters Patent. Patented Jan. 7, 1919.

Application filed May 29, 1916. Serial No. 100,554.

*To all whom it may concern:*

Be it known that I, JULIAN G. GOODHUE, a citizen of the United States, residing at Chicago, in the county of Cook and State of Illinois, have invented a certain new and useful Improvement in Apparatus for Treating Food or other Materials, of which the following is a full, clear, concise, and exact description, reference being had to the accompanying drawings, forming a part of this specification.

My invention relates to apparatus for treating food or other materials.

One of the objects of the invention is to provide a simple, practical, and effective apparatus capable of so treating food or other materials as to form a powdered food or other powdered article.

Another object of the invention is to arrange for the proper drying of the food or other material under treatment.

Further objects of the invention are to secure a high degree of efficiency in operation, as well as simplicity of construction; and also to attain the foregoing and other desirable results in a practical and advantageous manner.

In the accompanying drawings Figure 1 is a vertical longitudinal section of an apparatus embodying my present invention;

Figs. 2 and 3 are cross sections taken on lines 2—2, and 3—3, respectively in Fig. 1;

Fig. 4 is an end view of the rotary member, looking up; and

Fig. 5 is a detail view of one of the cutting devices.

The apparatus shown in the drawing for carrying out the invention comprises a base member 1, having supporting legs 2—2. A cylindrical shell 3 is mounted upon the base 1 and secured thereto by bolts $3^a$. A centrally arranged tubular member 4 is also mounted upon the base 1 and secured thereto by bolts $4^a$. Outside of the shell 3 is arranged a second or outer cylindrical shell 5 which is detachably secured to, but preferably made bodily removable from the base 1, as for example by means of bolts 6 securing flanges 7 at the lower edge of said shell 5 to the base member 1. The upper edge of said shell 5 is provided with an inwardly extending rim 8, which is detachably secured, as by means of bolts 10, to a flange $3^a$ at the top of the shell 3. A top 11 is also detachably secured, as by 12 to the flange $3^a$. Between the shell 3 and the inner member 4 is a rotary tubular member 13. The exterior of the member 4 is provided with a plurality (preferably four) of worm or screw members 14, and the interior of the rotary member 10 is provided with a plurality (preferably four) of coöperating worm or screw members 15. The worms or screw members 14 and 15 are so constructed as to feed the material under treatment in an upward direction when the rotary member 13 is rotated. The exterior of the rotary member 13 is provided with a plurality (preferably four) of worm or screw members 16, and the interior of the shell or casing 3 with coöperating worm or screw members 17, which said coöperating members feed the material downwardly when the member 13 is rotated. The base 1 is provided with an annular concave seat 20 on which the material may slide inwardly from the shell 3 to the member 4. The lower end screws 16 on member 13 are constructed with plow-like members 21 which move the material inwardly on the surface 21. The rotary member 13 is connected to a rotary shaft 23 which projects through a stuffing box 24 on the top 11 and is provided at its upper end with a pulley (not shown), or other device by which rotary motion can be transmitted to the member 13. Transversely extending cross members 25 are provided below the top 11 to transmit motion from shaft 23 to member 13.

An inlet pipe 28 for the material to be treated is provided at the upper end of the apparatus, as for example by being mounted upon the top 11 and an outlet 29 provided with a valve 30 is provided at the lower end of the apparatus as by being connected to the base member 1. A steam pipe 31 is mounted upon the base 1 and extended into the interior of the tubular member 4 and a drain pipe 32 is arranged at one side of said steam pipe 31.

A pipe 34 is preferably attached at the upper end of the apparatus and led to a condensing apparatus 35 by which a vacuum may be established and maintained within the main treatment chamber formed by the shell 3. This pipe 34 is also understood to be capable of connection with compressed air apparatus so as to permit pressure to be exerted upon the contents of the treatment chamber. Another steam pipe 37 is preferably secured to the outer shell 5 so as to permit the introduction of steam into the interior of said shell. An outlet or drain pipe 38 is provided in the base 1, communicating with the chamber formed by the shell 5. Cutting devices 40 are formed on a ring 41 which is mounted upon the top of the rotary member 13. Other cutting devices 42 are formed upon a ring 43 mounted upon the tubular member 4. By the rotation of the member 13 the cutting devices or knives 40 are caused to coöperate with the cutting devices or knives 42, thereby cutting the material which is fed upwardly by the screws 14 and 15. The arms 25 are provided with upwardly extending scraper members 44 which scrape the interior of the shell or casing 3 when the shaft 23 revolves. This prevents the accumulation of material upon the inner walls of said shell 3.

In using the apparatus, material to be treated is introduced through the pipe 28 and the shaft 23 is rotated. The material may be in various forms according to the nature of the product to be produced. For the production of powdered food products I preferably introduce material in a more or less granular form, the same having been suitably prepared and brought to such form prior to its introduction in this apparatus. The material so introduced is fed or moved downwardly by the screws 16 and 17 and proceeds downwardly to the bottom of said screws, whereupon it falls upon the concave seat 20 and is thence moved or pushed inwardly to engagement with the screws 14 and 15. By these screws the material is moved or forced upwardly to the tops of the same, from whence it emerges and passes outwardly to the screws 16 and 17 by which it is fed downwardly again. In this continuous downward and upward feeding movement, the material is crushed and ground, as well as fed, by the worm or screw feed devices, and it is also cut by the cutting devices at the top of the worm or screw devices. In this way the material is reduced from the granular or other state in which it may have been introduced into the apparatus, into a finely divided or powdered condition. At the same time it is dried by the heat which is continuously applied to substantially the entire path of travel of the material. Thus a finely divided or powdered thoroughly dried food or other product is obtained. When properly treated the finished product is withdrawn through the outlet 29 by opening the valve 30. A new charge may then be introduced and the process repeated. The treatment of the material in a vacuum is very advantageous for reasons given in a companion application covering the process disclosed herein. The apparatus is capable of use for other purposes, as will be readily apparent, other than the production of dry powdered food products as mentioned.

It will be understood that changes and modifications may be made without departing from the spirit of the invention.

What I claim is:

1. Apparatus of the class specified comprising screw feeding devices arranged to feed material in opposite directions, and heating means for heating the material as it moves in said opposite directions.

2. Apparatus of the class specified comprising screw feeding devices arranged to feed the material in opposite directions, and cutting devices for cutting the material, said cutting devices being located to cut the material passing from one direction to another.

3. Apparatus of the class specified comprising interiorly and exteriorly arranged feeding members arranged to feed material to be treated in opposite directions, said apparatus being provided with passages permitting the feed of material between said feeding devices.

4. Apparatus of the class specified comprising interiorly and exteriorly arranged screw devices arranged to feed the material in opposite directions, and passages for permitting the movement of material between said screw devices.

5. Apparatus of the class specified comprising an outer shell or casing containing a rotary member, and a supplemental member arranged within said rotary member, said rotary member being provided with feeding devices arranged to feed the material in opposite directions.

6. Apparatus of the class specified comprising an outer shell or casing containing a rotary member, and a supplemental member arranged within said rotary member, said rotary member and outer casing and supplemental member being provided with screw devices arranged to feed the material in opposite directions.

7. The combination with an exterior shell or casing of a rotary member therein and a supplemental member inside of the rotary member, the inside of the shell or casing and the exterior of the rotary member being provided with coöperating feeding devices and the interior of the rotary member and the exterior of the supplemental member being provided with coöperating feeding devices, the first mentioned feeding devices being arranged to feed the material in one direction, and the second mentioned feeding devices being arranged to feed the material in the reverse direction.

8. The combination with an exterior shell or casing of a rotary member therein and a supplemental member inside of the rotary member, the inside of the shell or casing and the exterior of the rotary member being provided with coöperating feeding devices, and the interior of the rotary member and the exterior of the supplemental member being provided with coöperating feeding devices, the first mentioned feeding devices being arranged to feed the material in one direction, and the second mentioned feeding devices being arranged to feed the material in the reverse direction, and the lower end of said rotary member being arranged to move the material from one set of feeding devices to the other.

9. The combination with an exterior shell or casing of a rotary member therein and a supplemental member inside of the rotary member, the inside of the shell or casing and the exterior of the rotary member being provided with coöperating feeding devices and the interior of the rotary member and the exterior of the supplemental member being provided with coöperating feeding devices, the first mentioned feeding devices being arranged to feed the material in one direction, and the second mentioned feeding devices being arranged to feed the material in the reverse direction, and cutting devices mounted upon said rotary and supplemental members.

10. The combination with an exterior shell or casing of a rotary member therein and a supplemental member inside of the rotary member, the inside of the shell or casing and the exterior of the rotary member being provided with coöperating feeding devices and the interior of the rotary member and the exterior of the supplemental member being provided with coöperating feeding devices, the first mentioned feeding devices being arranged to feed the material in one direction, and the second mentioned feeding devices being arranged to feed the material in the reverse direction, and a supplemental shell or casing surrounding the first mentioned shell or casing and provided with means for supplying a heating medium.

11. The combination with an exterior shell or casing of a rotary member therein and a supplemental member inside of the rotary member, the inside of the shell or casing and the exterior of the rotary member being provided with coöperating feeding devices, and the interior of the rotary member and the exterior of the supplemental member being provided with coöperating feeding devices, the first mentioned feeding devices being arranged to feed the material in one direction, and the second mentioned feeding devices being arranged to feed the material in the reverse direction, and a supplemental shell or casing surrounding the first mentioned shell or casing and provided with means for supplying a heating medium, said supplemental member being hollow and provided with means for supplying its interior with a heating medium.

12. The combination with an exterior shell or casing of a rotary member therein and a supplemental member inside of the rotary member, the inside of the shell or casing and the exterior of the rotary member being provided with coöperating feeding devices and the interior of the rotary member and the exterior of the supplemental member being provided with coöperating feeding devices, the first mentioned feeding devices being arranged to feed the material in one direction, and the second mentioned feeding devices being arranged to feed the material in the reverse direction, and cutting devices mounted upon said rotary and supplemental members, and a heating jacket outside of said shell or casing, said supplemental member being made hollow to provide a heating chamber and provided with means for supplying a heating medium.

13. The combination of a base provided with a shell or casing, and also provided with a stationary member provided on its exterior with screw or worm devices, a rotary member located between said shell or casing and said stationary member, said rotary member being provided on its inside with worm devices arranged to coöperate with the worm devices on said stationary member, and the exterior of said rotary member and the interior of said shell or casing being provided with coöperating worm devices, and a shaft upon which said rotary member is mounted extending through the end of the casing opposite said stationary member.

14. The combination of a base provided with a shell or casing, and also provided with a stationary member provided on its exterior with screw or worm devices, a rotary member located between said shell or casing and said stationary member, said rotary member being provided on its inside with worm devices arranged to coöperate with the worm devices on said stationary member, and the exterior of said rotary member and the interior of said shell or casing being provided with coöperating worm devices, and a shaft upon which said rotary member is mounted extending through the end of the casing opposite said stationary member, said rotary member being provided with scraping devices for scraping the interior of said shell or casing.

15. The combination of a hollow worm containing another worm working inside of it, said worms being adapted to feed material between them, said second worm being also hollow, and a third worm inside of said second worm.

16. The combination of a hollow worm containing another worm working inside of it, said worms feeding in opposite directions.

17. The combination of feeding, grinding and cutting devices, of means for heating the material while being acted upon by said devices.

18. The combination of feeding devices adapted also to act as grinding devices, and means for cutting material acted upon by said devices.

19. The combination of feeding devices adapted also to act as grinding devices, means for cutting material acted upon by said devices, and means for heating the material while it is being acted upon by said devices.

In witness whereof, I hereunto subscribe my name this 25th day of May A. D., 1916.

JULIAN G. GOODHUE.

Witnesses:
A. L. JONES,
HAZEL A. JONES.